No. 679,261. Patented July 23, 1901.
A. B. JOHNSON.
PERFORATED MENSURATION SCALE.
(Application filed May 22, 1899.)
(No Model.)
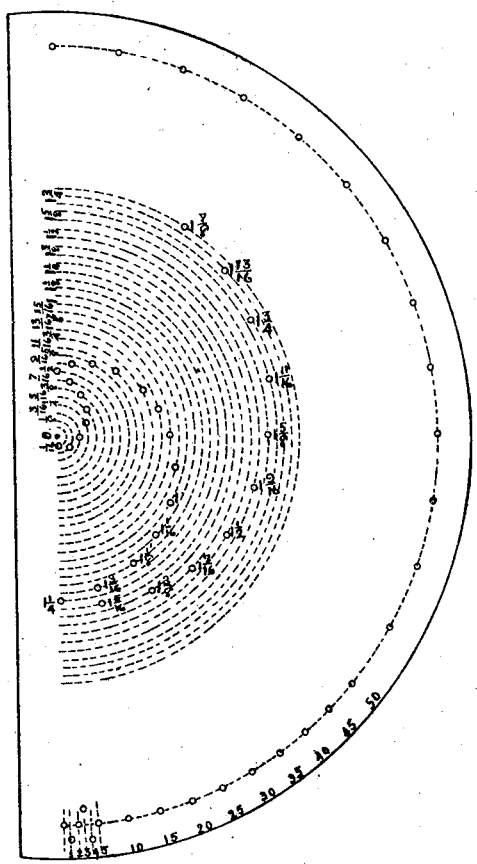
Witnesses:
Inventor.
Asahel B. Johnson,
by O. M. Clarke
his Attorney

UNITED STATES PATENT OFFICE.

ASAHEL B. JOHNSON, OF PITTSBURG, PENNSYLVANIA.

PERFORATED MENSURATION-SCALE.

SPECIFICATION forming part of Letters Patent No. 679,261, dated July 23, 1901.

Application filed May 22, 1899. Serial No. 717,696. (No model.)

*To all whom it may concern:*

Be it known that I, ASAHEL B. JOHNSON, a citizen of the United States, residing at Pittsburg, in the county of Allegheny and State of Pennsylvania, have invented or discovered a new and useful Improvement in Perforated Mensuration-Scales, of which the following is a full, clear, and exact description, reference being had to the accompanying drawing, forming part of this specification.

The drawing illustrates a face view of a protractor provided with my improved perforated mensuration-scale.

My invention relates to an improvement in scales for mensuration of plane surfaces, and has reference particularly to the art of making scale drawings; and it has for its object the laying off of measurements in a more expeditious and easy manner than by the usual method of transfers from an ordinary scale.

The invention consists in the use of minute perforations of a size to permit the insertion of a pencil-point, such perforations being made through any suitable material or instrument adapted for the purpose, and arranged in such a manner that readings may be made on the scale either as to full size or on reduced scales and transferred to paper by simply pointing off the distances through the perforations.

In the drawing I have shown the invention as applied to a protractor wherein a series of annular perforations 3 is used to denote the division of the circle into degrees, each degree being indicated, if desired, by continuing the staggered arrangement of perforations indicated for the first five degrees, which arrangement, it will be well understood, may be extended entirely around the semicircle, although it is not necessary to illustrate it. A similar arrangement of perforations is employed in the interior to indicate distances from the center marked zero (0) for the purpose of laying off circles of any radius within the compass of the protractor. The manner of using the instrument by means of the indicating characters will be entirely clear to those skilled in the art, and, in fact, the availability of this scale will be readily appreciated and understood by any one having need of a rapid and simple means of laying off dimensions. When embodied with the ordinary tools of a draftman's use, as a triangle or protractor, the invention becomes one of especial utility and service; and I desire to include within the scope of the claim all such applications and variations as would suggest themselves to the skilled mechanic.

What I claim is—

A flat scale having a curved edge with an initial curved row of perforations regularly spaced and having a determinate arrangement with relation to a unit of measurement, indicating characters therefor representing multiples of such unit, and subsequent rows of perforations arranged concentric to and laterally parallel to and intermediate of the perforations of such initial row, in like determinate arrangement, so as to define subdivisions thereof, and having a central perforation with subsequent perforations arranged spirally at successively-increasing distance outward from such central perforation with indicating characters therefor, substantially as set forth.

In testimony whereof I have hereunto set my hand.

ASAHEL B. JOHNSON.

Witnesses:
PETER J. EDWARDS,
C. M. CLARKE.